(12) United States Patent
Yuan

(10) Patent No.: US 8,378,995 B2
(45) Date of Patent: Feb. 19, 2013

(54) TOUCH DISPLAY SYSTEM WITH OPTICAL TOUCH DETECTOR

(75) Inventor: Kun-I Yuan, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 597 days.

(21) Appl. No.: 12/629,130

(22) Filed: Dec. 2, 2009

(65) Prior Publication Data

US 2010/0271334 A1    Oct. 28, 2010

(30) Foreign Application Priority Data

Apr. 27, 2009    (CN) .......................... 2009 1 0301891

(51) Int. Cl.
    *G06F 3/042* (2006.01)
(52) U.S. Cl. ....................................................... 345/175
(58) Field of Classification Search .................. None
    See application file for complete search history.

(56) References Cited

U.S. PATENT DOCUMENTS 6,972,753 B1 * 12/2005 Kimura et al. ................ 345/175
7,460,110 B2 * 12/2008 Ung et al. ..................... 345/173

* cited by examiner

*Primary Examiner* — K. Wong
(74) *Attorney, Agent, or Firm* — Altis Law Group, Inc.

(57) ABSTRACT

An exemplary touch display system includes a flexible touch screen, a prism, an infrared light source, an infrared image sensor, and a processor. The prism is substantially isosceles right-angled triangular shaped, with a first side surface thereof being disposed adjacent to but spaced apart from back surface of the touch screen by air, wherein when a touch is applied to the touch display surface at a touch position, the touch screen is bent at the touch position and contact the prism at a contact position corresponding to the touch position. The infrared light source and the infrared image sensor are arranged adjacent to and facing to a hypotenuse surface of the prism. The processor is configured for processing image signals from the image sensor and obtaining the contact position based on light intensities of the image signals, thereby obtaining the touch position on the touch display surface.

11 Claims, 4 Drawing Sheets

TOUCH DISPLAY SYSTEM WITH OPTICAL TOUCH DETECTOR

BACKGROUND

1. Technical Field

The present disclosure relates to touch display systems, and particularly, to a touch display system with an optical touch detector for detecting touch positions.

2. Description of Related Art

Touch display systems have been widely used in electronic devices, such as personal digital assistants (PDAs) and mobile phones.

Touch screens and touch detectors are key components for touch display systems. The touch screen is a display which can display images according to touches applied thereto. The touch detector is for detecting touch positions of a user's finger or a stylus on the touch screen. Currently, resistance films, capacitance films and surface acoustic wave systems are popularly used as touch detectors. However, the resistance film and the capacitance film reduce the light transmittance of the touch screen. Furthermore, the surface acoustic wave system is liable to absorb dust and water, thereby impairing the performance of the touch display system.

What is needed, therefore, is a touch display system which can overcome the above-described shortcomings.

BRIEF DESCRIPTION OF DRAWINGS

Many aspects of the present touch display system can be better understood with reference to the following drawings. The components in the drawings are not necessarily drawn to scale, the emphasis instead being placed upon clearly illustrating the principles of the present touch display system. Moreover, in the drawings, like reference numerals designate corresponding parts throughout the several views, and all the views are schematic.

DETAILED DESCRIPTION OF EMBODIMENTS

Embodiments of the present touch display system will now be described in detail below and with reference to the drawings.

Figure 1:
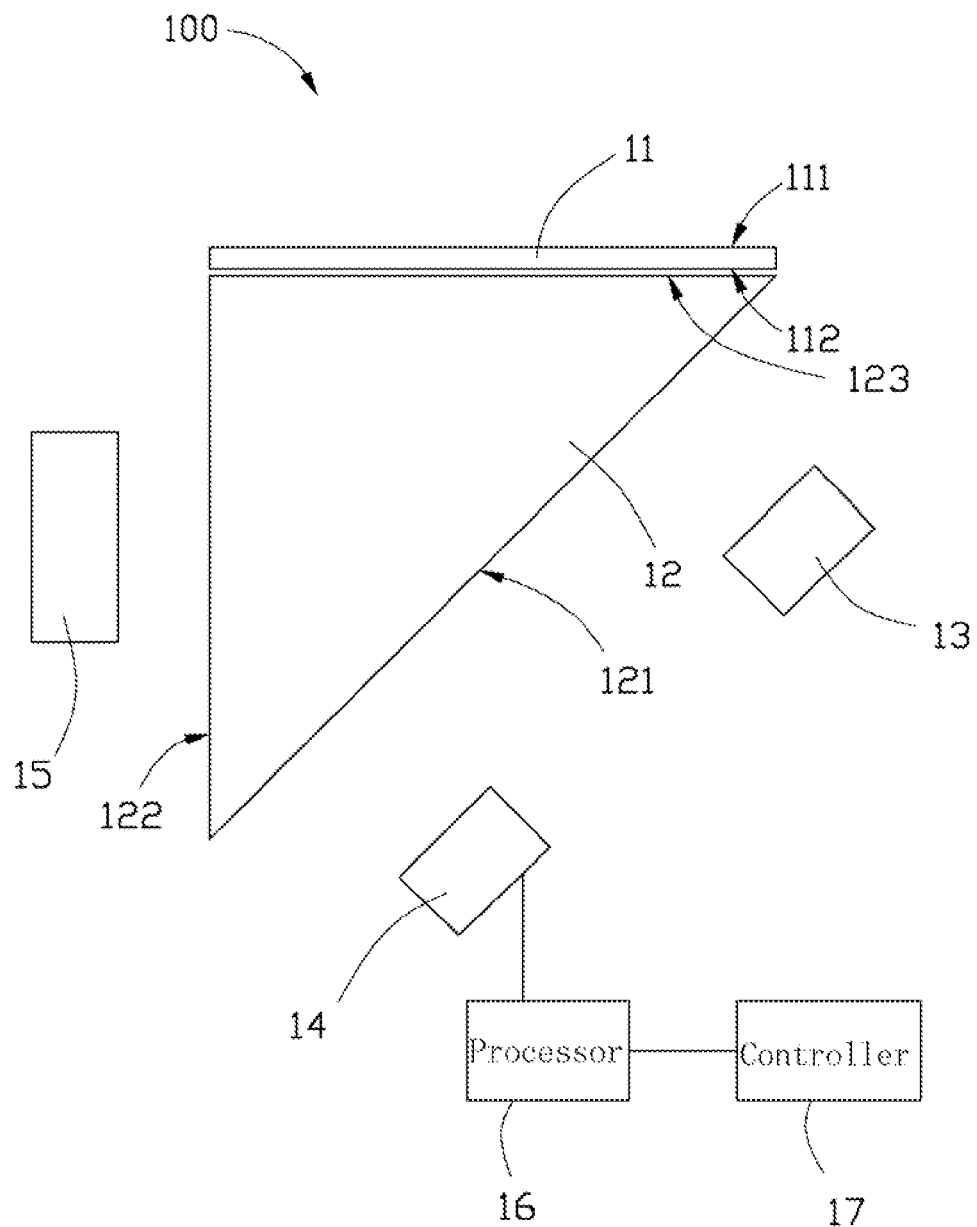
FIG. 1 is a plan view of a touch display system in accordance with a first embodiment, the touch display system including a touch screen.

Referring to FIG. 1, a touch display system 100 in accordance with a first embodiment is shown. The touch display system 100 includes a touch screen 11, a prism 12, an infrared light source 13, an infrared image sensor 14, a visible light source 15, a processor 16, and a controller 17.

The touch screen 11 includes a touch display surface 111 facing a user, and an opposite back surface 112. The touch screen 11 is in the form of a sheet, and thus is flexible. The wording "flexible" herein and after presents the same or similar characteristic as follows: when a touch is applied to the touch screen 11 at a touch position, e.g., by a stylus 18 (see FIG. 3), the touch screen 11 is bent at the touch position; and after the stylus 18 is removed, the bent portion of the touch screen 11 rebounds to its original shape.

Figure 2:
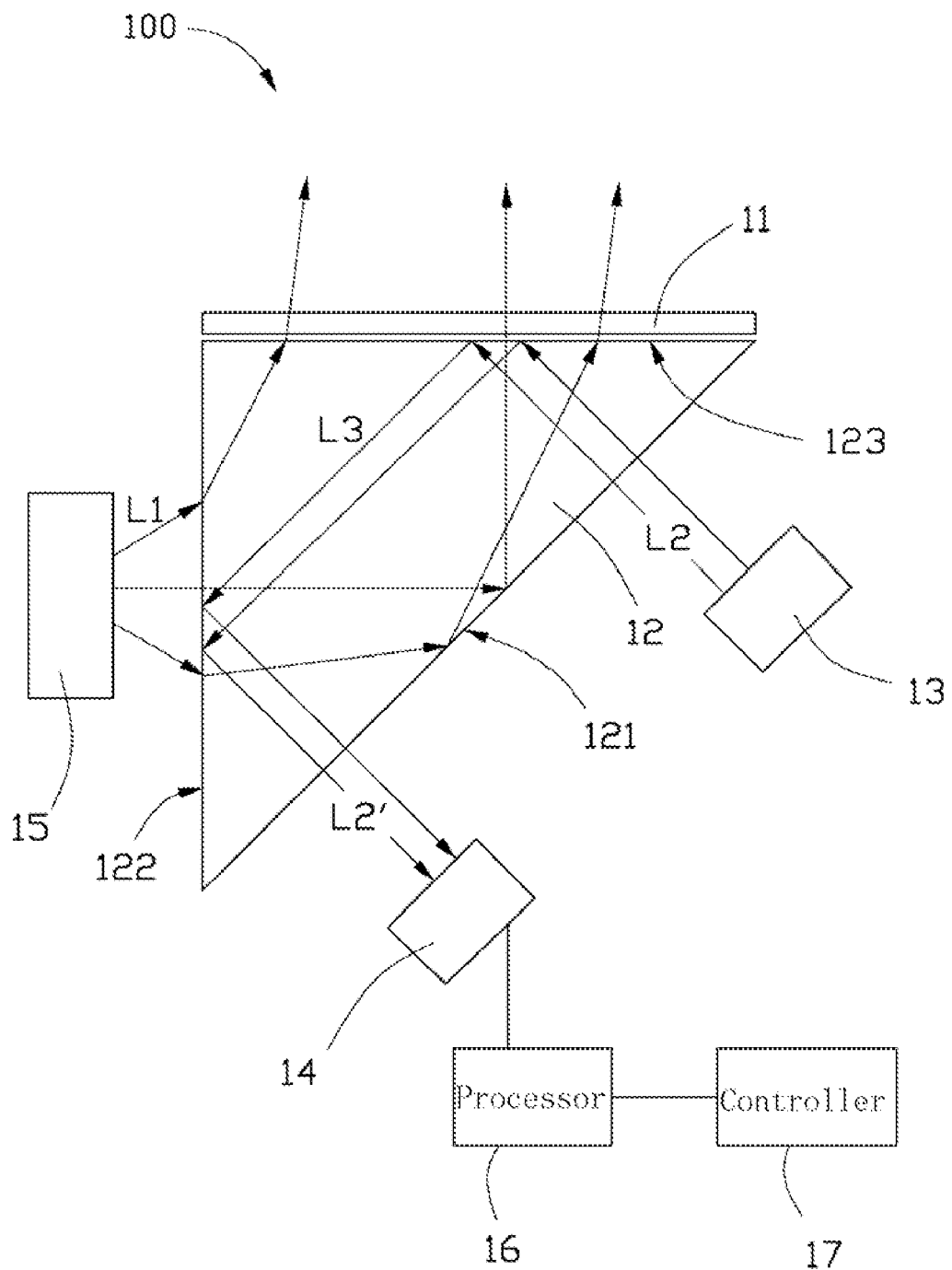
FIG. 2 is similar to FIG. 1, but showing essential optical paths when no touch is applied to the touch screen.

The prism 12 is substantially an isosceles right-angled triangular prism, and includes a first side surface 123, a second side surface 122 and a hypotenuse surface 121. In the present embodiment, the prism 12 is made of glass. The first side surface 123 is disposed adjacent to but spaced apart from the back surface 112 of the touch screen 11. Preferably, an area of the first side surface 123 is equal to that of the touch display surface 111. A refractive index of the prism 12 is smaller than that of the touch screen 11, but greater than that of air. If no touch is applied to the touch screen 11, any position of the first side surface 123 is spaced apart from the touch screen 11 by an air gap (see FIG. 2). When the touch screen 11 is touched, the touch screen 11 at the touch position is bent in towards and contacts the first side surface 123 at a position corresponding to the touch position (see FIG. 3).

The infrared light source 13 and the infrared image sensor 14 are arranged near and face the hypotenuse surface 121, and the visible light source 15 is arranged near the second side surface 122. The visible light source 15 emits visible light beams L1, and the light beams L1 transmit into the prism 12 through the second side surface 122 and finally transmit out of the prism 12 from the first side surface 123. The light beams L1 are able to illuminate the touch screen 11. The infrared light source 13 is configured for emitting infrared light beams, and the infrared image sensor 14 only detects infrared light beams. That is, the light beams L1 emitted from the visible light source 15 do not affect the infrared image sensor 14.

Light beams L2 emitted from the infrared light source 13 transmit into the prism 12 through the hypotenuse surface 121, and incident angles of the light beams L2 incident on the first side surface 123 are greater than critical angles of total reflection. With this configuration, referring to FIG. 2, when no touch is applied to the touch screen 11, the following light transmission characteristics are present. Because the refractive index of the prism 12 is greater than that of air, the light beams L2 incident on the first side surface 123 are totally reflected by the first side surface 123. The totally reflected light beams L2 are designated as light beams L3. Because the included angle between the first side surface 123 and the second side surface 122 is a right angle, incident angles of the light beams L3 on the second side surface 122 are the same as incident angles of the light beams L2 on the first side surface 123, and thus the light beams L3 are totally reflected by the second side surface 122. The totally reflected light beams L3 are designated as light beams L2'. The light beams L2' transmit out of the prism 12 from the hypotenuse surface 121, and the infrared image sensor 14 receives the light beams L2' and converts the light beams L2' into image signals.

Figure 3:
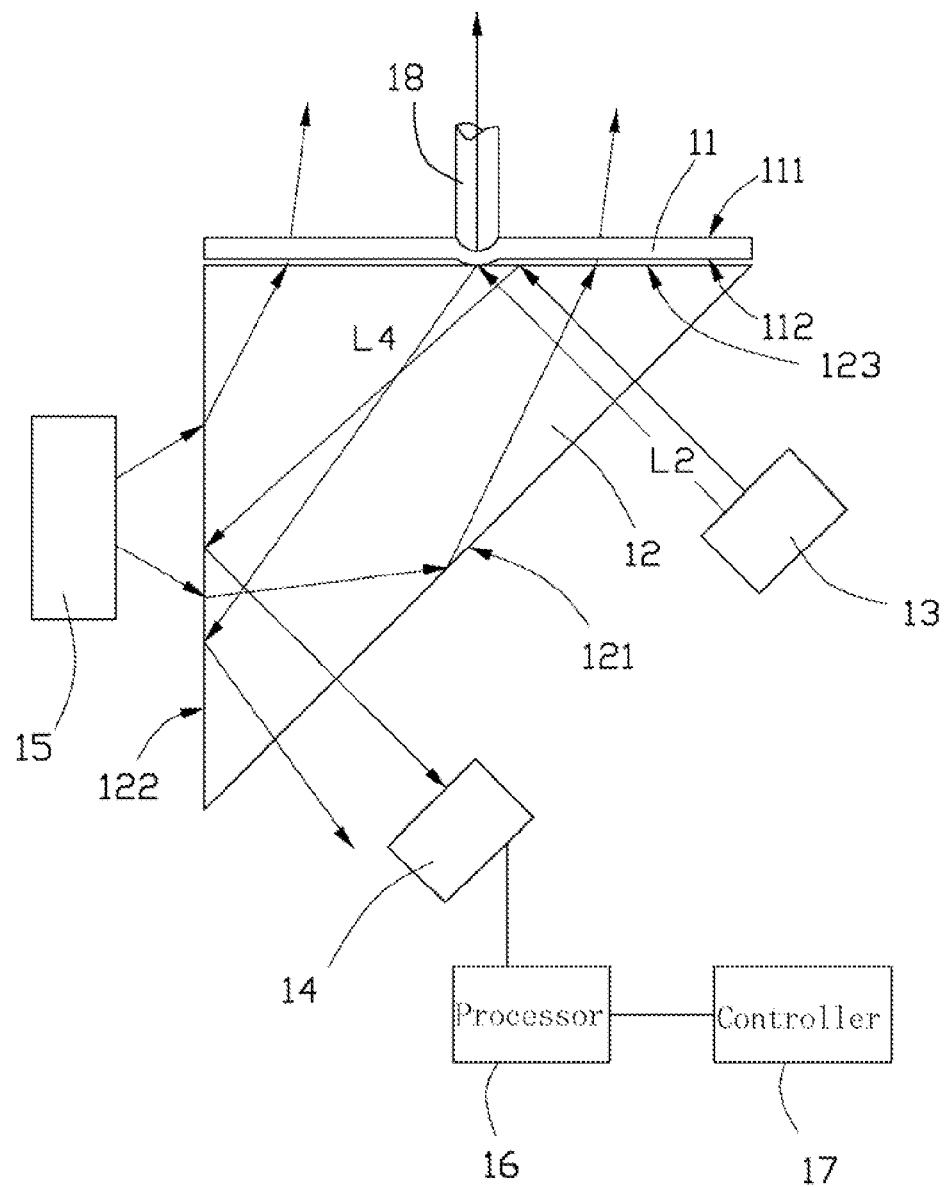
FIG. 3 is similar to FIG. 2, but showing essential optical paths when a touch is applied to the touch screen.

Referring to FIG. 3, when a touch is applied to the touch screen 11, the following light transmission characteristics are present. At the contact position on the first side surface 123 corresponding to the touch position on the touch screen 11, because the refractive index of the prism 12 is smaller than that of the touch screen 11, the light beams L2 incident on the first side surface 123 at the contact position partially transmit out of the prism 12 from the first side surface 123, and are partially reflected by the first side surface 123. The reflected light beams L2 are designated as light beams L4. Thus, the total reflection condition prevailing when no touch is applied to the touch screen 11 is broken at the contact position. The light beams L4 are still totally reflected by the second side surface 122 and then transmit out of the prism 11 from the hypotenuse surface 121. The infrared image sensor 14 receives the light beams L4 (representing the light beams partially reflected by the first side surface 123), and converts the light beams L4 into image signals associated with the contact position.

In addition, in parts of the prism 12 except the contact position, light beams are still totally reflected by the first side surface 123 and the second side surface 122, and the infrared image sensor 14 receives and converts the totally reflected light beams into image signals associated with parts of the prism 12 except the contact position.

The processor 16 is electrically connected to the infrared image sensor 14, and configured for receiving the image signals from the infrared image sensor 14 and processing the image signals. Because the light intensity of the contact position is smaller than that of other positions in the prism 12, the contact position is detected, and thus the touch position on the touch screen 11 can be identified. The controller 17 is electrically connected to the processor 16, and configured for generating a response to the touch instruction.

It is understood that if the prism 12 is made of plastic, the prism 12 may be flexible in addition to the touch screen 11 being flexible. The flexible plastic can for example be soft polyvinyl chloride. Under this condition, if the touch screen 11 presses down the first side surface 123, incident angles of the light beams L2 on the first side surface 123 at the contact position would be changed, and the incident angles may no longer be greater than critical angles of total reflection. In this way, the total reflection condition can also be broken at the contact position. That is, the light intensity of the contact position is smaller than that of other positions in the prism 12. Thus the contact position is detected, and the touch position on the touch screen 11 can be identified.

Figure 4:
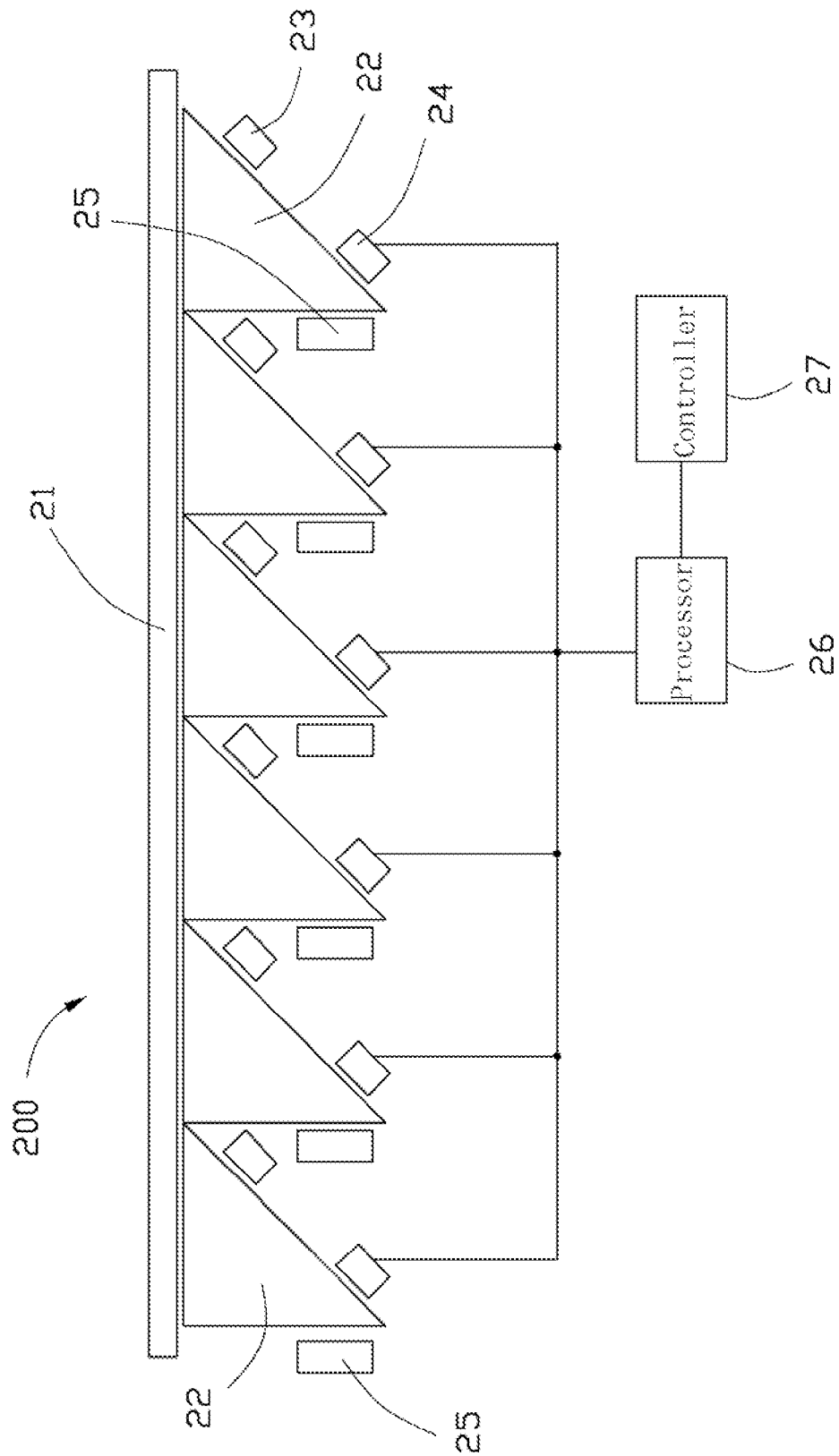
FIG. 4 is a plan view of a touch display system in accordance with a second embodiment.

Referring to FIG. 4, a touch display system 200 in accordance with a second embodiment is shown. The touch display system 200 is essentially similar in structure, principle, and operation to the touch display system 100 described above. However, the touch display system 200 includes a plurality of prisms 22 juxtaposed one by another, with first side surfaces thereof connected to each other. The first side surfaces face a touch screen 21. An infrared light source 23, an infrared image sensor 24 and a visible light source 25 are arranged around two sides of each prism 22. A processor 26 is electrically connected to each of the infrared image sensors 24, and a controller 27 is electrically connected to the processor 26.

It is understood that the above-described embodiments are intended to illustrate rather than limit the embodiments. Variations may be made to the embodiments without departing from the spirit of the invention. Accordingly, it is appropriate that the appended claims be construed broadly and in a manner consistent with the scope of the embodiments.

What is claim is:

1. A touch display system, comprising:
    a flexible touch screen comprising a touch display surface and an opposite back surface;
    a substantially isosceles right-angled triangular prism, comprising a first side surface, a second side surface and a hypotenuse surface, the first side surface being disposed adjacent to but spaced apart from the back surface of the touch screen by an air gap, wherein when a touch is applied to the touch display surface at a touch position, the touch screen is bent at the touch position and contacts the prism at a contact position corresponding to the touch position;
    an infrared light source and an infrared image sensor arranged adjacent to and facing the hypotenuse surface such that when the touch is applied to the touch display surface, at positions in the prism except the contact position, light beams emitted from the infrared light source and transmitted into the prism through the hypotenuse surface are totally reflected in sequence by the first side surface and the second side surface and then transmit out of the prism from the hypotenuse surface, and the infrared image sensor receives and converts the totally reflected light beams into image signals associated with positions in the prism except the contact position; and at the contact position, light beams emitted from the infrared light source and transmitted into the prism through the hypotenuse surface partially transmit out of the prism from the first side surface and are partially reflected by the first side surface, the partially reflected light beams are then reflected by the second side surface and then transmit out of the prism from the hypotenuse surface, and the infrared image sensor receives and converts the partially reflected light beams into image signals associated with the contact position; and
    a processor configured for processing the image signals from the image sensor and obtaining the contact position based on light intensities of the image signals, thereby obtaining the touch position on the touch display surface.

2. The touch display system as described in claim 1, wherein an area of the first side surface of the prism is substantially equal to that of the touch display surface.

3. The touch display system as described in claim 1, wherein incident angles of the light beams incident on the first side surface are greater than critical angles of total reflection.

4. The touch display system as described in claim 1, wherein a refractive index of the touch screen is greater than that of the prism.

5. The touch display system as described in claim 1, wherein the prism is made of flexible material.

6. The touch display system as described in claim 1, further comprising a visible light source arranged adjacent to the second side surface, wherein light beams emitted from the visible light source are capable of transmitting into the prism through the second side surface and transmitting out of the prism from the first side surface.

7. A touch display system, comprising:
    a flexible touch screen comprising a touch display surface and an opposite back surface;
    a plurality of isosceles right-angled triangular prisms juxtaposed one by another, the prisms each comprising a first side surface, a second side surface and a hypotenuse surface, the first side surfaces being disposed side by side adjacent to but spaced apart from the back surface of the touch screen by an air gap, wherein when a touch is applied to the touch display surface at a touch position, the touch screen is bent at the touch position and contacts at least one of the prisms at a contact position thereof corresponding to the touch position;
    a plurality of infrared light sources and a plurality of infrared image sensors, wherein each of the infrared light sources and each of the infrared image sensors forms a pair, and each pair is arranged adjacent to and facing a corresponding one of the hypotenuse surfaces such that when the touch is applied to the touch display surface, at said at least one of the prisms, in positions except at the contact position, light beams emitted from the corresponding infrared light source and transmitted into said at least one of the prisms through the hypotenuse surface are totally reflected in sequence by the first side surface and the second side surface and then transmit out of said at least one of the prisms from the hypotenuse surface, and the corresponding infrared image sensor receives and converts the totally reflected light beams into image signals associated with positions in said at least one of the prisms except the contact position; and at the contact position, light beams emitted from the corresponding infrared light source and transmitted into said at least one of the prisms through the hypotenuse surface partially transmit out of said at least one of the prisms from the first side surface and are partially reflected by the first side surface, the partially reflected light beams are then reflected by the second side surface and then transmit out of said at least one of the prisms from the hypotenuse surface, and the infrared image sensor receives and converts the partially reflected light beams into image signals associated with the contact position; and a processor electrically connected to the infrared image signals, and configured for processing the image signals from each infrared image sensor associated with said at least one of the prisms and obtaining the contact position of said at least one of the prisms based on light intensities of the image signals, thereby obtaining the touch position on the touch display surface.

8. The touch display system as described in claim 7, wherein incident angles of the light beams incident on the first side surface of said at least one of the prisms are greater than critical angles of total reflection.

9. The touch display system as described in claim 7, wherein a refractive index of the touch screen is greater than those of the prisms.

10. The touch display system as described in claim 7, wherein the prisms are made of flexible material.

11. The touch display system as described in claim 7, further comprising a plurality of visible light sources arranged adjacent to the respective second side surfaces, wherein light beams emitted from the visible light sources are capable of transmitting into the respective prisms through the second side surfaces and transmitting out of the respective prisms from the first side surfaces.

* * * * *